Nov. 15, 1960 F. HALOSKI 2,960,250
PORTABLE THERMAL FOOD CONTAINER
Filed Sept. 13, 1956 2 Sheets-Sheet 1

Inventor:
Frank Haloski,
By
Soans, Anderson, Luedeka + Fitch
Attys.

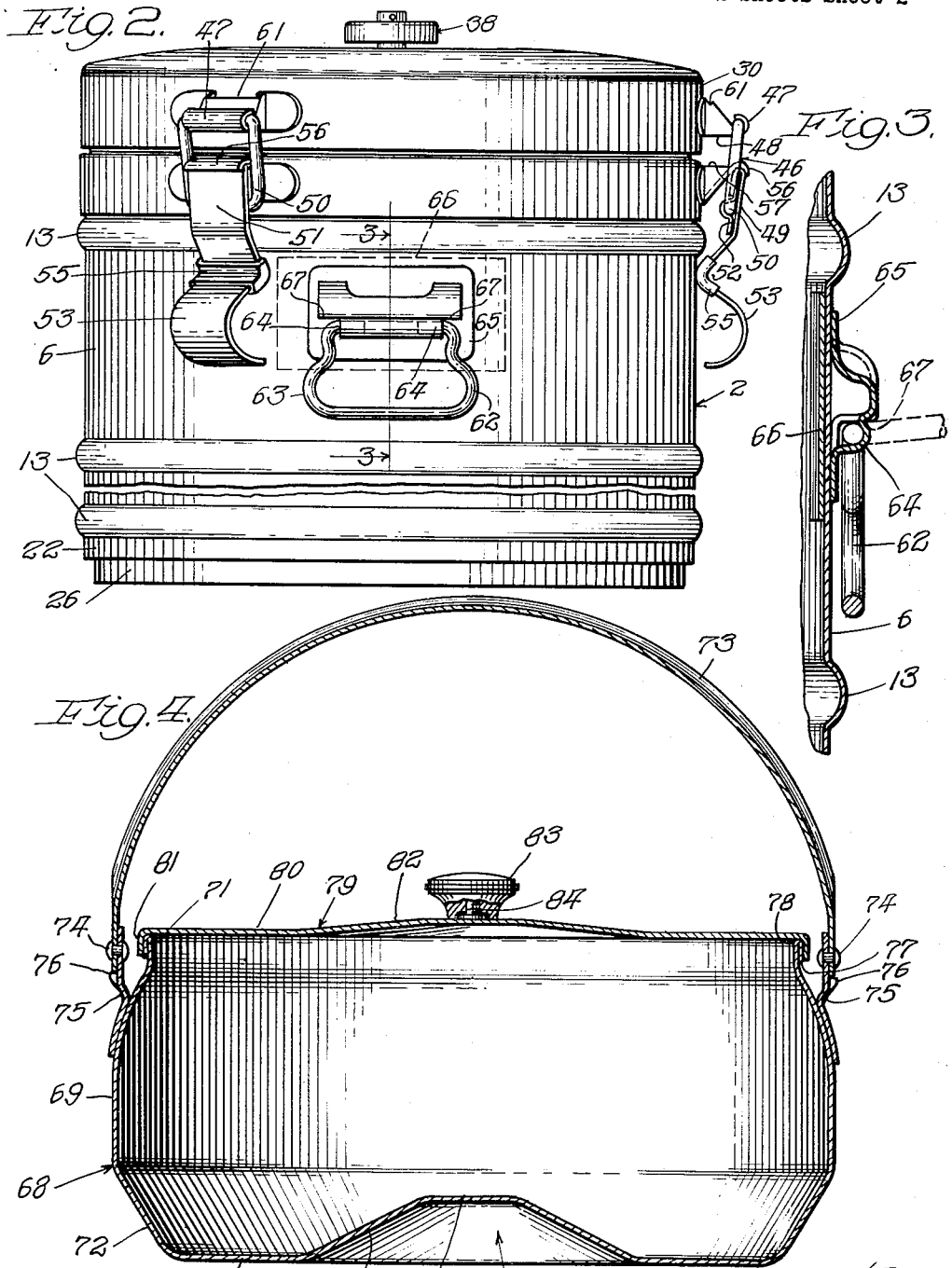

2,960,250

PORTABLE THERMAL FOOD CONTAINER

Frank Haloski, Chicago, Ill., assignor to Vacuum Can Company, a corporation of Illinois Filed Sept. 13, 1956, Ser. No. 609,669

3 Claims. (Cl. 220—17)

This invention relates to a portable food container, and more particularly to portable thermal food containers. Vacuum insulated portable thermal food containers are known, a typical example being shown in U.S. Patent No. 2,662,965, Becker, December 15, 1953. The container shown in the said prior patent represents a practicable and efficient container so far as its temperature holding capacity is concerned but said prior container does not make the most advantageous use of its capacity, especially in respect of the storing of foods in separate containers, and it involves certain constructional details which, for some services, may subject the container to criticism in respect of certain matters of hygiene.

The object of the present invention is to provide a highly efficient portable thermal food container, especially one constructed of metal and vacuum insulated although other materials and forms of insulation may be used; to provide such a container which is very durable, easy to clean, and which resists the collection and holding of foreign matter on its visible surface as well as on its interior surface; to provide a portable thermal food container with a plurality of individual storage pans which will make use of a maximum amount of the storage capacity of the main container; to provide for a container of the character indicated, a set of storage pans which will be easy to remove from the container, which will be easy to clean, and which may be stacked or nested in the container and effectively held in place therein; and, in general, it is the object of the present invention to provide an improved portable food container of the character indicated.

Other objects and advantages of the invention will be understood by reference to the following specification and accompanying drawings (2 sheets) wherein there is described and illustrated a vacuum insulated metal portable food container according to a selected embodiment of the invention.

In the drawings:

Fig. 2 is a side elevation of the upper end portion of the container;

Fig. 3 is a fragmentary cross section on the line 3—3 of Fig. 2;

Fig. 4 is a cross section on a vertical plane through the axis of a pan which is adapted for use within the container.

Figures 1, 5:
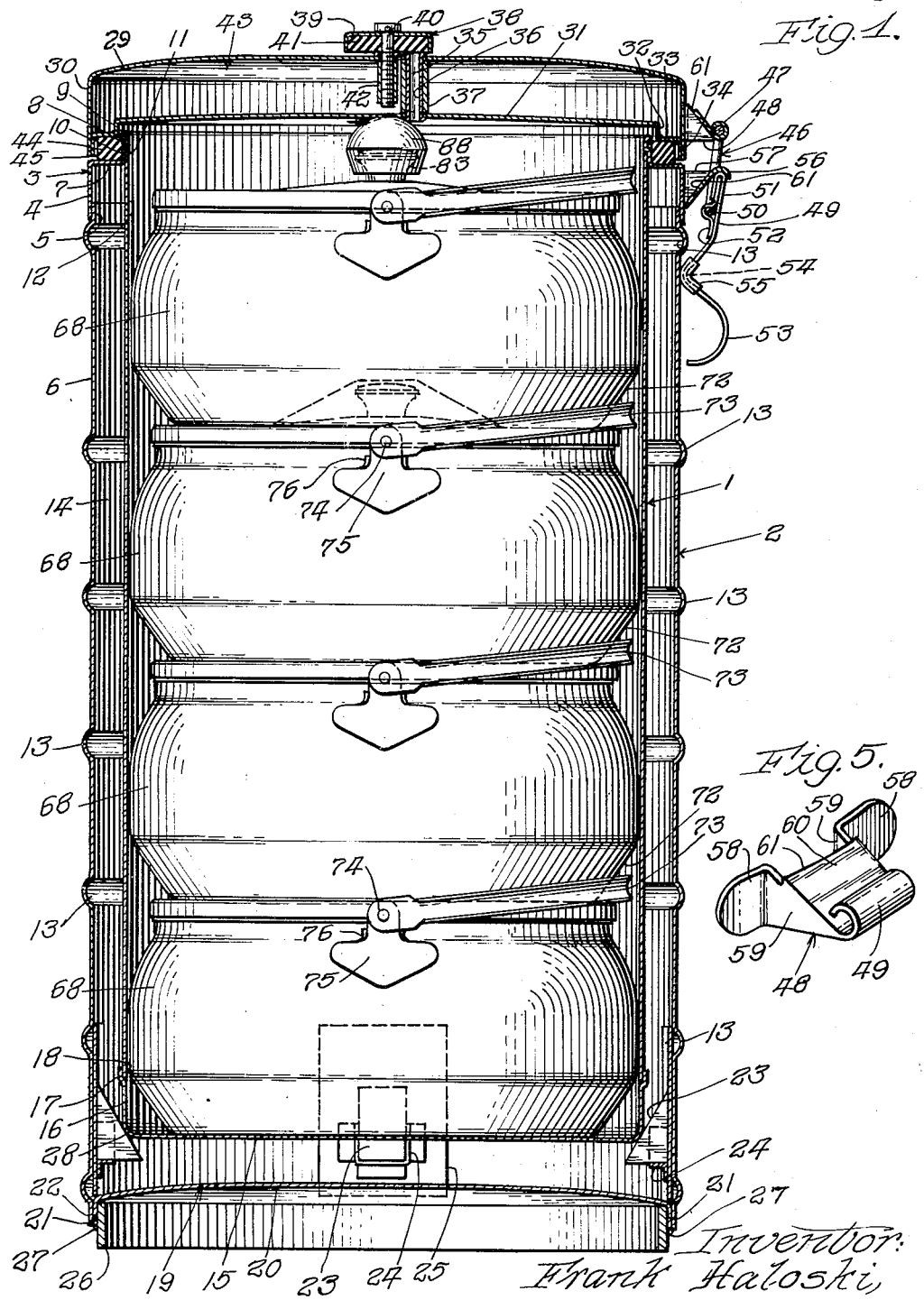
Fig. 1 is a cross section on a vertical plane through the axis of a container according to the invention.
Fig. 5 is a perspective illustration of a detail.

The portable food container according to the present invention comprises a main container which is provided with a cover by means of which the main container may be sealed closed, and a stack or nest of pans, each having a cover or lid and which covered pans may be removably seated in and locked in substantially fixed position in the main container when the latter is closed.

The main container comprises inner and outer receptacles 1 and 2 respectively. These receptacles are joined at their upper ends by means of a neck ring 3 which has a lower flange portion 4 telescoped over an upper marginal portion 5 of the side wall 6 of the said outer receptacle 2. Said flange portion 4 is suitably secured to said outer container, preferably by continuous seam welding around the entire circumference of the united parts. Said neck ring 3 has a horizontally disposed inwardly extending flange portion 7, and an inner flange 8 which extends upwardly from the inner edge of said horizontal flange. Said inner flange portion 8 terminates in an outwardly rolled upper end edge or bead 9 which defines the mouth of the container. Said flange 8 is provided with a recessed lower part 10 which receives the upper marginal portion 11 of the inner container side wall 12 in substantially coaxial relationship to the upper portion of said neck ring. The mutually lapping parts 10 and 11 are also joined together by a continuous seam weld. The joints between said neck ring and said inner and outer receptacles are made air tight, especially when the container is to be vacuum insulated, and the crevice between the end of said inner receptacle side wall and the upper portion of the neck ring is filled or closed as a part of the welding of the parts together and finished to smoothness in continuity of the inside surface of said inner receptacle wall 12.

The outer receptacle 2 is provided with a plurality of outwardly pressed annular ribs 13 which serve to strengthen said outer receptacle and prevent its inward collapse when the container is vacuum insulated.

The container and its inner and outer receptacles are of generally cylindrical form, the inner receptacle being of smaller diameter than the outer receptacle so as to provide a space 14 between the side walls of the receptacles. This space extends between the bottoms of the receptacles and may be vacuumized to provide effective thermal insulation between the inner and outer containers, or it may be filled with any suitable thermal insulating material.

The lower end of the inner receptacle 1 is closed by a bottom member which has a bottom wall 15 and an annular upwardly extending side wall portion 16 which has its upper marginal portion 17 offset outwardly to provide a recess for receiving the lower marginal portion 18 of the inner receptacle side wall 12 in substantially concentric relationship to the lower side wall portion of the bottom member. The side wall portion 18 is suitably welded continuously around the circumference of the inner container to the bottom member to provide a leak proof sealed joint between these parts, and any crevice between the lower end of the side wall portion 18 and said bottom is filled and closed as a part of the welding operation. This joint is ground or otherwise suitably finished to smooth continuation of the interior surface of the inner wall 12.

The outer receptacle 2 is closed at its bottom by means of a bottom member 19 which has a slightly upwardly arched bottom wall 20 and a depending annular side wall flange 21 which is a snug fit within the lower marginal portion 22 of the side wall of said outer receptacle 2. The joint between the parts 21 and 22 is also continuously sealed as by seam welding around the entire circumference of the container to provide a leak proof connection between the said parts.

The lower or bottom end of the inner receptacle 1 is held in position against radial shifting relative to the outer receptacle 2 by means of a plurality (four in this instance) of supports each comprising a block 23 seated in suitable supporting bracket 24 which is welded to a plate 25 of considerably larger size than the block 23 and bracket 24. The plate 25 is spot welded or otherwise securely fixed to the side wall 6 of the outer receptacle. The provision of the relatively large plate 25 permits spot welding at points suitably spaced to insure a good bond between the plate and the side wall 6. The supporting blocks 23 may be of wood or other material which is a poor conductor of heat so as to avoid transmission of heat from either of said receptacles to the other.

The mouth connection by means of the neck ring 3 is made first, then the spacing blocks 23 with their supporting elements are put in place and secured to the outer receptacle after which the bottom of the outer receptacle is closed as already described.

The bottom of the receptacle is further provided with a reinforcing and wearing band 26 which is seated telescopically within the depending flange 21 of the outer receptacle bottom member, said ring 26 being suitably secured to the surrounding flange and lower margin of the outer receptacle, preferably by continuous seam welding as indicated at 27 which will seal any crevice which may appear between the ring 26 and the adjacent flange 21 and which will substantially fill the corner formed by the outer face of the ring 26 and the lower end of the flange 21 to thereby eliminate said corner as a potential trap for a holder of dirt and other foreign matter.

It will be observed that in the main container construction described, the interior of the container is a smooth, continuous, recess-free surface, the side wall 12 being joined to the bottom wall 15 by an arcuate corner portion 28. There are no crevices or similar traps inside the inner receptacle in which food or other matter may lodge and resist removal by ordinary washing methods.

The cover for the container comprises an outer or top member 29 which is formed with an upwardly convex or downwardly and outwardly inclined top surface substantially as shown, and a depending peripheral flange 30 which provides the outer wall of the cover. The cover also comprises an inner or lower wall 31 which is also preferably but not necessarily upwardly convex, and which is provided at its outer margin with a stepped formation which comprises an inner depending vertical flange portion 32, a horizontally outwardly extending flange portion 33 and another downwardly extending peripheral annular flange portion 34. The flange portion 34 is a tight fit within the lower marginal portion of the wall flange 30 of the upper cover part and said portion 34 of the inner cover member is continuously seam welded around the circumference of the cover to the surrounding lower marginal portion of the cover side wall flange 30.

A vent opening 35 is provided through the cover by means of a tubular rivet 36 and a spacer 37, the latter being interposed between spaced portions of the cover members 29 and 31; the tubular rivet has its end portions spun over the said outer and inner members 29 and 31 to hold the same tightly against the ends of said spacer 37. This vent 35 is adapted to be closed by means of a cap 38 which comprises a downwardly facing cupped metal member 39 which is welded or otherwise rigidly connected to a screw 40. A suitable rubber or other compressible washer 41 is seated in said cup 39. The screw 40 is threaded through a bushing 42 which is secured to and depends from the cover member 29 into the space 43 between the cover members 29 and 31. It will be seen that by turning the cap 38 so as to cause the screw 40 to move inwardly of the cover structure, the compressible gasket 41 will be seated on the upper end of the vent tube 36 to close the same. Said vent may be opened by unscrewing the cap, and the cap may be completely removed from the cover so as to afford free access to the underside of the cap and to the vent for cleaning purposes.

The vent opening 35 may be provided with a nipple for use in connection with a cap for closing the vent. Such a cap may be provided with suitable wings to facilitate loosening and may be provided with a channel to permit opening of the vent when the cap is loosened. Such an arrangement permits removal of the cap and attachment of various adaptors for purposes of siphoning of the contents of the receptacle 1 or removing the contents of the receptacle by means of pressure. In addition, the cap may be removed to permit insertion of a stirrer in the receptacle which stirrer can be rotated on top of the cover by means of a handle to agitate the contents of the receptacle 1.

The space 43 within the cover may be vacuumized if desired, provided that the vent structure is suitably sealed and the bushing 42 is made long enough to be joined to both the cover members 29 and 31 with leak proof connections or otherwise sealed to prevent air leakage into said space, but it has been found that a simple dead air space in the cover structure provides adequate insulating effect for the relatively small area of the cover.

A compressible annular gasket or ring 44 is seated on the horizontal flange 7 of the neck ring 3 and the cover is in turn seated through the agency of its inside horizontal flange 33 on said gasket. When the cover is in place on the main container, its outer wall portion 30 is preferably substantially concentrically aligned with the neck ring flange 4 so that the main body of the container together with its cover presents a substantially smooth continuous wall surface from top to bottom with only a small gap or opening 45 between the cover and the flange 7 substantially as shown.

The cover is adapted to be locked in place on the container by means of a plurality (three in this instance) of over-the-center latch devices which are attached to the cover and releasably engageable with suitable brackets which are secured to the main container, preferably to the side wall flange portion 4 of the neck ring 3.

As shown in Figure 1, each latch comprises a link 46 which is fixedly anchored at its upper end in an eye 47 provided in a bracket 48 which has base ears (see Fig. 5) seated against and welded to the side wall 30 of the cover. At its lower end, the link 46 pivotally carries a latch member 49, the latter being pivotally mounted on the link 46 as indicated at 50 and provided with an upwardly projecting nose portion 51. A suitable bracket 52 has a portion which cooperates with the nose 51 of the latch member 49 to provide an eye for receiving the lower portion of said link 46 and said bracket 52 has legs which are seated against and welded to said latch member 49. The lower end portion of the latch member 49 is provided with a hook part 53 and an inwardly projecting abutment or stop part 54 which is covered with a rubber or other suitable protective sleeve 55 for engaging the adjacent portion of the outer container wall 6. The hook 53 provides a means for convenient finger engagement with the latch member 49 for rocking said latch member on its pivot mounting 50 and the link 46 about its pivot in the eye 47 to release the lock from the locked condition in which it is illustrated in Figure 1.

The upper end or nose 51 of said latch member 49 engages a downwardly facing hook portion 56 of a bracket 57 which is welded or otherwise suitably secured to the wall flange 4 of the neck ring 3.

The brackets 48 and 57 are of generally like construction except for the provision of the eye 47 in one and the hook 56 in the other. These brackets are preferably stamped sheet metal fittings formed with ears 58 which are joined by laterally extending legs 59 to a central web portion 60 which is formed with the eye 47 or the hook 56 as the case may be. The web portion 60 is terminated as indicated at 61 short of the cover side portion 30 (and short of the flange 4) to prevent the collection of foreign matter at that point and to facilitate cleaning by brushing or the passage of suitable cleaning tools through the space between the edge 61 and said wall 30 or flange 4 and into the space between the end walls 59 and the angularly extending portion 60.

A pair of handles 62 are provided at diametrically opposed points in the circumference of the main container, preferably between the uppermost pair of reinforcing ribs 13 as shown in Fig. 2. These handles each comprise a suitably formed handle link 63 which is pivotally mounted as indicated at 64 in a bracket 65 which may be of stamped sheet metal construction and rigidly secured to the outer side wall portion 6 of the container. Said outer side wall portion 6 is reinforced in the area of the handle bracket 65 by means such as a plate 66 which is suitably welded to the inside of said outer wall portion 6. The bracket 65 is seam or spot welded to the adjacent underlying container wall portion and reinforcing plate 66. The bracket 65 in which the handle 63 is pivoted is preferably formed with shoulders indicated at 67 which limit the upward swinging movement of the handle relative to the bracket to an approximately horizontal position in which the handle extends laterally from the container for carrying purposes. The handles cannot swing upwardly against the walls of the container when the container is being carried by means of these handles.

The described container and cover structure is preferably but not necessarily made of stainless steel or other non-corrosive metal which will provide the required strength. If the container is to be vacuum insulated, stainless steel is very satisfactory because of its great strength and its capacity to resist buckling when the space 14 is vacuumized, especially when said outer container is provided with said ribs 13 which aid the container in resisting inward buckling. It will, of course, be understood that there is but little if any possibility that the inner container will be distorted because of the vacuum; this follows because the vacuum tends to expand the inner receptacle whereas such expansion is not a significant possibility under the pressure incident to the vacuum.

A container of the construction described having a capacity of 11 gallons in the inner receptacle would be about 14 inches or so in outside diameter over the reinforcing ribs 13, and its overall height, including the cover, would be about 28 inches; the internal diameter of the inner receptacle would be approximately 12¼ inches and its depth about 21½ inches. The thickness of metal in the side wall 12 of the inner receptacle may be in the neighborhood of .026 inch, and the thickness of the outer receptacle side wall 6 may be in the neighborhood of .03 inch. The dimensions given are in respect of stainless steel wall construction having properties suitable for the purpose of the container. The insulating space 6 may be vacuumized sufficiently to raise a column of mercury ⅛ of an inch in diameter to a height of 28 inches. These foregoing dimensions and degree of vacuum are not critical and are given merely as representative of one practical embodiment of the described structure.

The thermally insulated container above described may be filled with hot or cold food or beverage which may be dispensed in any suitable manner. The full diameter mouth of the container makes it very practicable to dispense the content by ladling out of the container. Provision of the handles 62 make it easy to handle the container for pouring material therefrom into smaller containers for distribution purposes. For many purposes it is preferred to provide a set of smaller containers or pans which may be housed in the main container and individually removed as required and distributed or employed for dispensing individual servings. In this instance a stack of four individually covered pans 68 is illustrated in place in the vacuum insulated container.

The individual pans in said stack are preferably of like construction and each has a substantially cylindrical side wall portion 69 (see Fig. 4), a bottom wall portion 70 and an open neck or mouth 71. The cylindrical or mid-portion 69 of the side wall of the pan is of an external diameter which is a close but nevertheless free fit within the inner receptacle 1 of the insulated container. The lower portion of the side wall 69 is joined to the bottom 70 of the pan by means of an angularly disposed corner portion 72 whereby space is provided around the lower portion of the pan for accommodating a portion of a handle 73 of the immediately underlying pan in the stack as shown in Fig. 1. This handle 73 is of bail form and is pivoted at its opposite end as indicated at 74 to the upper end portion of a bracket 75 which is secured to the upper portion of the side wall of the pan, preferably by welding so as to avoid any perforation of the pan body. The upper portions of the brackets 75 are provided with ears such as indicated at 76 which are so positioned that they limit downward swinging movement of the handle to the angular position represented in Figure 1 so that a portion of said handle will remain above the plane of the top of the pan for easy access. The handle may be swung to either side of the pan, stop ears 76 being provided to limit such movement in both directions.

The mouth of the pan is reinforced by an outwardly rebent flange portion 77 of the pan body, the provision of this rebent reinforcement serving also to provide a smooth rounded mouth end 78.

A cover 79 is provided for each pan, this cover having a flat and substantially horizontal peripheral portion 80 and a depending peripheral flange 81 which is adapted to fit snugly around the outside of the reinforced mouth portion of the pan body. The central portion 82 of the cover is offset upwardly and is provided with a suitable plastic material knob 83 for facilitating manipulation of the cover. This knob 83 is preferably secured to the cover through the agency of a screw post 84 which is welded or otherwise secured to the outside or top surface of the cover and threaded to fit a tapped socket in the knob. The attachment of the knob screw 84 in the manner set forth avoids any puncturing of the cover so that the inside face of the cover remains free of crevices or similar places where food or other matter might become trapped and difficult to remove. As shown, the peripheral flange 81 is joined to the cover portion 80 by a smoothly rounded corner which is easy to clean and in which there is but little if any tendency to trap and hold food particles or other matter.

The central portion 85 of the bottom of the pan is offset upwardly as shown to provide a central recess 86 on the outside of the pan bottom for receiving the central upwardly projecting portion 82 and the knob 83 of the cover of the underlying pan. As illustrated, the pan, like the cover, is formed without sharp corners or crevices so that cleaning of the pan may also be very easily effected.

It will be observed that the bottom portion 70 of the pan is substantially flat and in a horizontal plane so that it will sit firmly on the correspondingly flat and horizontal annular portion 80 of the cover of the underlying pan in the stack. The vertical depth of the central bottom recess 86 is only slightly greater than the vertical extension of the cover portion 82 and knob 83 so that the knob does not bear against the central recessed portion of the bottom of the overlying pan. However, the angular wall portion 87 of the pan bottom is so related to the angular central portion 82 of the pan cover that the latter interfits with the bottom wall portion 87 to hold the pans in a vertically aligned stack. When the pans are in the container, the container itself will prevent the pans from shifting laterally relative to one another, but the described interfitting relationship of the pan bottoms and the covers aids in keeping the pans from moving relative to each other to even the slight extent which would be permitted by the free fit of the pans in the inner container 1. Also, it is advantageous for stacking the pans for storage and other purposes independently of the container.

To maintain the stack of pans firmly in place in the insulated container and to resist movement of the pans relative to each other and relative to the insulated container a bumper 88 (Fig. 1) of rubber or other suitable compressible material is detachably fitted over the knob 83 of the uppermost pan cover. This bumper 88 is of such form and size that when the cover of the container is put on and locked in place, the inner wall 31 of the container cover will bear on and compress said bumper 88 and thereby exert resilient downward pressure on the stack of pans to hold the same against shifting of the container as aforesaid.

A set of four pans of the character described which fits within a container having the proportions and capacity above set forth, will hold about eight gallons or somewhat more so that nearly seventy-five percent of the capacity of the container will be held by the set of pans so that capacity loss by the use of the pans is held to a low figure.

The described structure is well adapted for the transportation of food and beverages from central kitchens to industrial plants remote from such kitchens, and for the transportation of foods and beverages by military and naval forces. The ease with which the container, its cover, and the pans and their covers, may be cleaned is a very important factor in the adaptability of the container to these uses. The effective vacuum insulation permits construction of the container with minimum dimensions for the capacity of the container and the all-metal construction adds durability. Although stainless steel is preferred for the container and the pans, either or both may be made of other suitable material which is non-corroding or which is suitably treated to prevent corrosion thereof by the foods, beverages or other goods placed in the container and in the pans. The described container and pans may of course be used for the transportation or storage of materials other than foods and beverages, especially when it is desired to store the materials at a selected temperature for a predetermined time period within the capacity of the container.

Changes in the details of construction may be made while retaining the principles of the invention.

I claim:

1. A portable food container comprising telescopically assembled, relatively fixedly associated outer and inner metal receptacles, the inner receptacle of said container having a bottom and an open mouth end, a closure for the mouth end of said inner receptacle and means detachably securing said closure to said container, a set of pans housed in the container and stacked on one another, said set of pans being in sliding engagement with the side wall of said inner receptacle and the lowermost pan of said stacked pans being seated on the bottom of said inner receptacle, means whereby the closure holds the stack of pans firmly against the bottom of said inner receptacle when the closure is secured to the container as aforesaid, each of said pans having a bottom wall and an open top, a cover removably seated on the top of each pan, said cover having an upwardly projecting knob, and the bottom of each pan having a portion offset upwardly from the normal bottom plane of the pan and dimensioned so as to provide a recess only for receiving the knob of the cover of the next lower pan in the stack of pans, each of said pans also having a bail-form handle pivoted to opposite sides thereof, means for normally supporting said handle in a down position in which said handle extends toward the side of the pan and angularly upwardly of the top of the pan adjacent the side thereof, the lower side wall and adjacent bottom portions of each pan being recessed to provide a space around the bottom of the pan for receiving the upwardly projecting handle portion of the next lower pan in said stack.

2. A portable food container comprising telescopically assembled, relatively fixedly associated outer and inner metal receptacles, the inner receptacle of said container having a bottom and open mouth end, a closure for the mouth end of said inner receptacle and means detachably securing said closure to said container, said closure being provided with a vent extending therethrough to the interior, and a cap being provided for said vent, said cap being adjustably and detachably secured to said closure whereby said vent may be closed and opened, a set of pans housed in the container and stacked on one another, said set of pans being in sliding engagement with the side wall of said inner receptacle and the lowermost pan of said stacked pans being seated on the bottom of said inner receptacle, means whereby the closure holds the stack of pans firmly against the bottom of said inner receptacle when the closure is secured to the container as aforesaid, each of said pans having a bottom wall and an open top, a cover removably seated on the top of each pan, said cover having a centrally positioned upwardly projecting knob, and the bottom of each pan having a central portion offset upwardly from the normal bottom plane of the pan and dimensioned so as to provide a recess only for receiving the knob of the cover of the next lower pan in the stack of pans, each of said pans also having a bail-form handle pivoted to opposite sides thereof, and means for normally supporting said handle in a down position in which said handle extends toward the side of the pan and angularly upwardly of the top of the pan adjacent the side thereof, the lower side wall and adjacent bottom portions of each pan being recessed to provide a space around the bottom of the pan for receiving the upwardly projecting handle portion of the next lower pan in said stack.

3. A portable food container having a bottom and an open mouth end, a closure for said mouth end, a plurality of pans stacked vertically within the container in closely fitting relation to the inner wall surface of the container, each of said pans comprising a bottom wall, a side wall extending upwardly from said bottom wall and providing an open top, a cover removably seated on said top, said bottom wall being of reduced diameter with respect to the major diameter of said side wall, with the lower portion of said side wall tapering inwardly to the periphery of said bottom, and a bail-form of handle pivotally connected at its opposite ends with said side wall by means affording positioning of said handle in angularly upward relation to the top of said pan and within the recess provided between the inclined lower side wall portion of the overlying pan and the inner wall of the food container.

References Cited in the file of this patent

UNITED STATES PATENTS

| | | |
|---|---|---|
| 597,217 | Loery | Jan. 11, 1898 |
| 661,190 | Olson | Nov. 6, 1900 |
| 756,638 | Howell | Apr. 5, 1904 |
| 1,064,099 | Silk | June 10, 1913 |
| 1,451,768 | Falls | Apr. 17, 1923 |
| 1,521,782 | Meier | Jan. 6, 1925 |
| 1,548,820 | Bray | Aug. 11, 1925 |
| 2,026,701 | Pearl | Jan. 7, 1936 |
| 2,147,886 | Devine | Feb. 21, 1939 |
| 2,427,138 | Hamilton et al. | Sept. 9, 1947 |
| 2,488,611 | Stallings | Nov. 22, 1949 |
| 2,510,671 | Verheyden | June 6, 1950 |
| 2,519,862 | Verheyden et al. | Aug. 22, 1950 |
| 2,543,839 | Faris | Mar. 6, 1951 |
| 2,546,166 | Ffefferkorn | Mar. 27, 1951 |
| 2,604,226 | Cramer | July 22, 1952 |

FOREIGN PATENTS

| | | |
|---|---|---|
| 344,363 | Italy | Nov. 6, 1936 |